INVENTOR.
JOHN H. STARR

ATTORNEYS

Nov. 3, 1953          J. H. STARR          2,657,780

SELF-INTERRUPTING CLUTCH

Filed June 9, 1949          4 Sheets-Sheet 2

INVENTOR.
JOHN H. STARR
BY
ATTORNEYS

Nov. 3, 1953  J. H. STARR  2,657,780
SELF-INTERRUPTING CLUTCH
Filed June 9, 1949 4 Sheets-Sheet 3
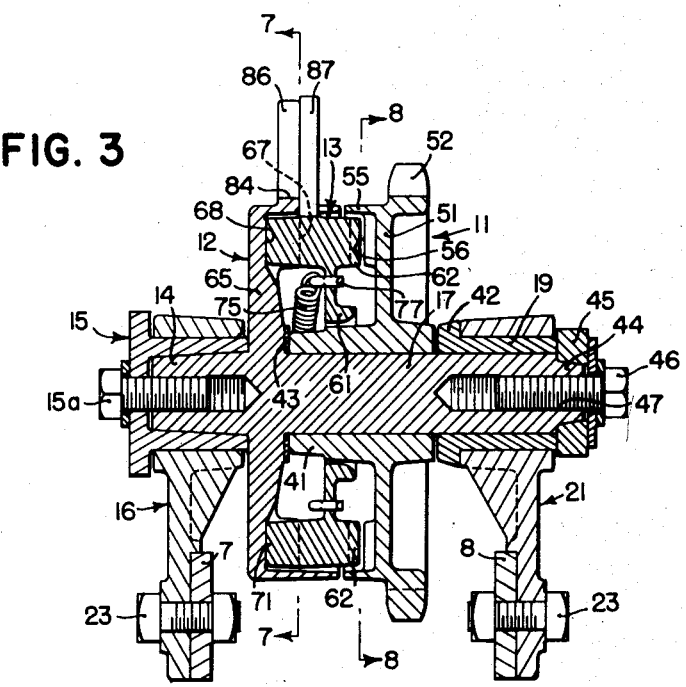
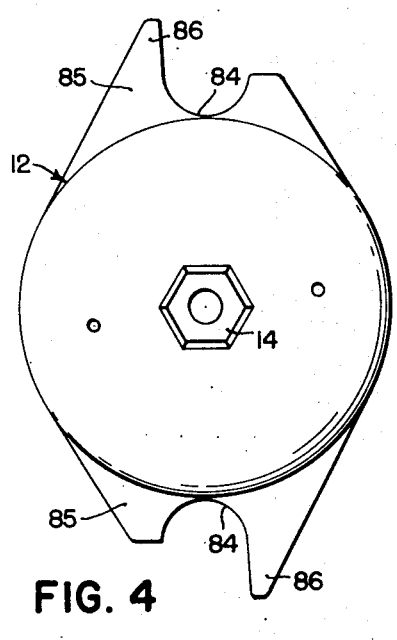
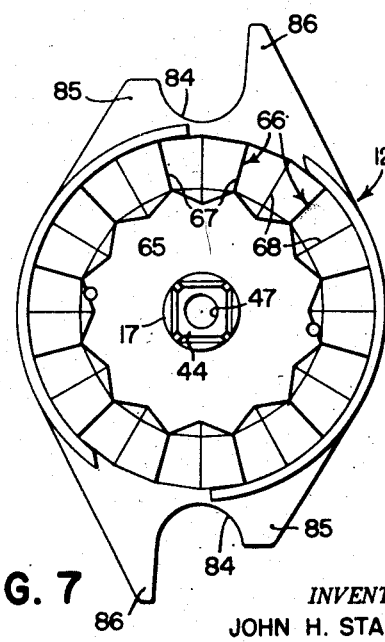
INVENTOR.
JOHN H. STARR
BY
ATTORNEYS Nov. 3, 1953          J. H. STARR          2,657,780
SELF-INTERRUPTING CLUTCH Filed June 9, 1949                    4 Sheets-Sheet 4

*INVENTOR.*
JOHN H. STARR
BY
*ATTORNEYS*

Patented Nov. 3, 1953

2,657,780

UNITED STATES PATENT OFFICE 2,657,780

SELF-INTERRUPTING CLUTCH

John H. Starr, Mayville, Wis., assignor to John Deere Van Brunt Company, Horicon, Wis., a corporation of Wisconsin Application June 9, 1949, Serial No. 98,012

14 Claims. (Cl. 192—62)

The present invention relates generally to agricultural implements and more particularly to self-interrupting clutches of the plow lift type.

The object and general nature of the present invention is the provision of a self-interrupting clutch mechanism of the half-revolution type arranged to raise and lower the tools or other parts of an agricultural implement. More particularly, it is an important feature of the present invention to provide a self-interrupting clutch of this type which is stronger, has fewer parts, is easier to assemble and is more reliable in operation than prior clutches. Further, it is an important feature of this invention to provide a self-interrupting clutch which has greater capacity than prior clutches of the same type, principally because the parts are arranged to have engaging connection at a plurality of points between the driving and driven elements rather than at only one or two points, as in prior clutches with which I am familiar.

Specifically, it is a feature of the present invention to provide a clutch unit having driving and driven members, each with a circumferential set of serrations, or notches and projections, on the inwardly facing sides of said members, operating in conjunction with a central control or engaging member which has on opposite sides companion serrations or notches and projections and shiftable by suitable control means into and out of engaged and disengaged positions relative to the driving member of the clutch while maintained at all times in driving connection with the driven member of the clutch. It is also an important feature of this invention to provide new and improved action in a clutch of this type whereby the clutch, when engaged in operating position, may readily be disengaged without overloading the clutch control, and yet without sacrificing a positive connection between the driving and driven parts. Still further, it is an additional feature of this invention to provide means for holding the controlling or engaging member of the clutch out of contact with the driving member, which ordinarily is a continuously rotating part, whereby the clutch unit does not clatter or vibrate when the driven and engaging parts of the clutch are locked in non-moving position with the driving member of the clutch rotating idly. Still further, it is another feature of this invention to provide a clutch including driving and driven members with control means so constructed and arranged as to form a wedging connection between the driving and driven members when the clutch is engaged; yet so constructed and arranged that the driven member of the clutch may overrun the driving member when necessary or desirable.

These and other objects and advantages of the present invention will be apparent to those skilled in the art after a consideration of the following detailed description, taken in conjunction with the accompanying drawings, in which:

Figure 3 is a transverse sectional view taken through the clutch unit.

Figure 4 is a view showing the outer side of the driven member of the clutch.

Figure 8:
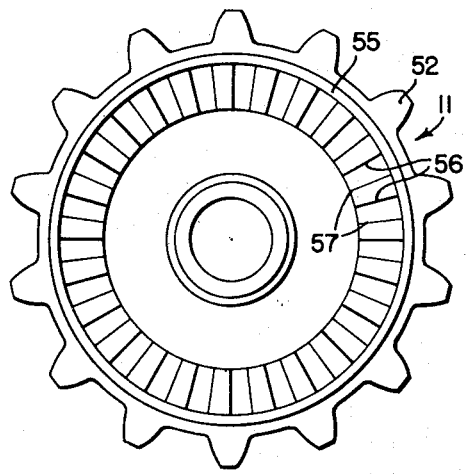

Figures 7 and 8 are elevational views, showing the inner faces of the driven and driving members, respectively, of a clutch, being in general sectional views taken along the lines 7—7 and 8—8 of Figure 3.

Figures 1, 9, 10:
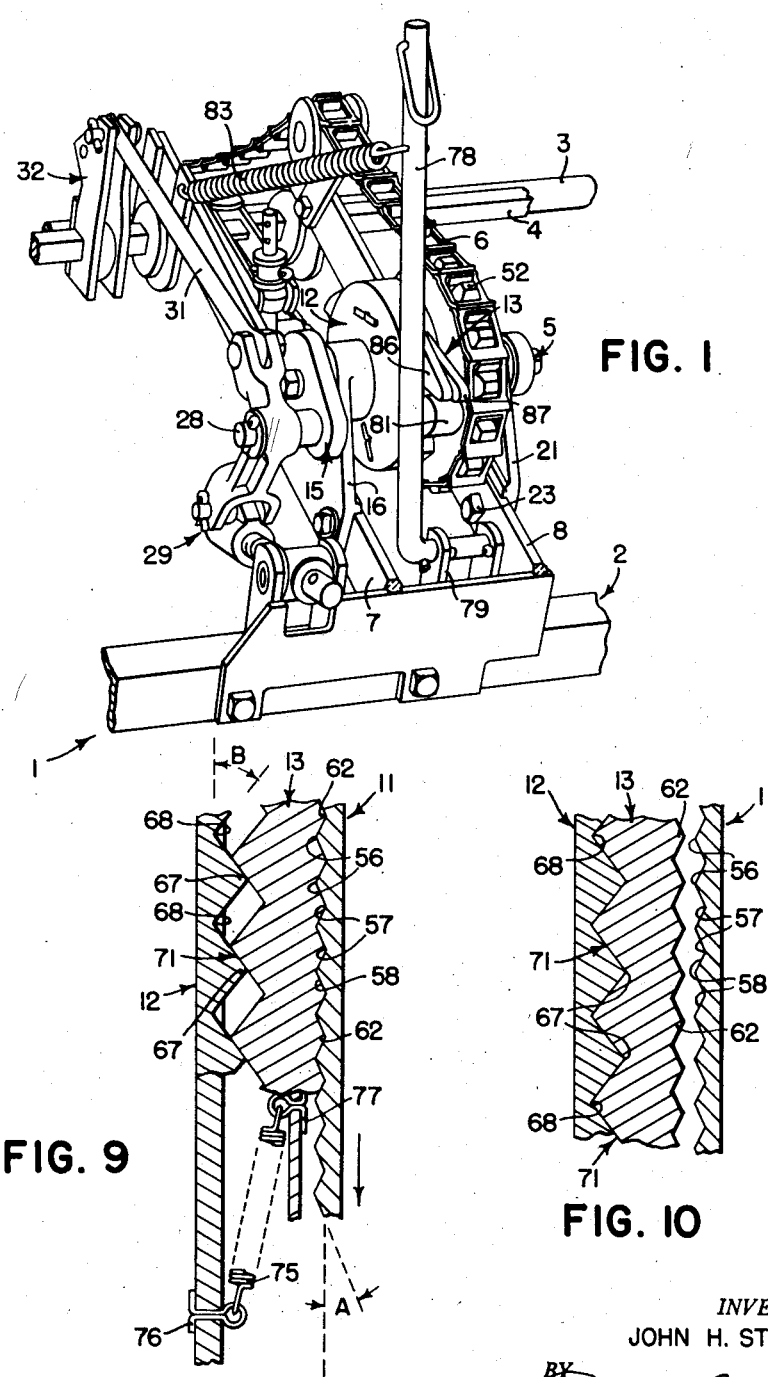
Figure 1 is a fragmentary perspective view of the power lift mechanism of a grain drill, in which a clutch incorporating the principles of the present invention, has been shown, by way of example.
Figure 2:
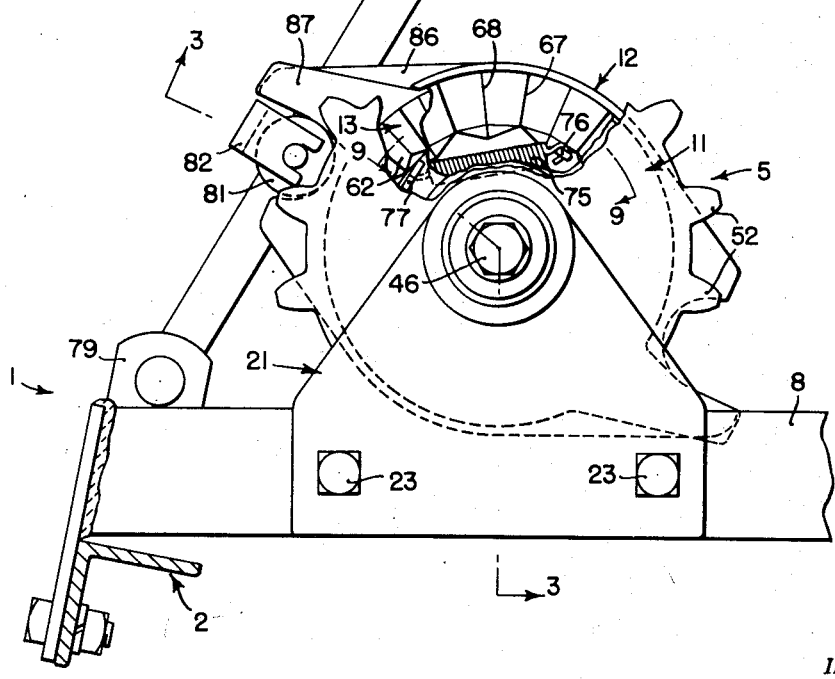
Figure 2 is a side view showing details of the clutch and the controlling trip lever therefor.
Figure 5:
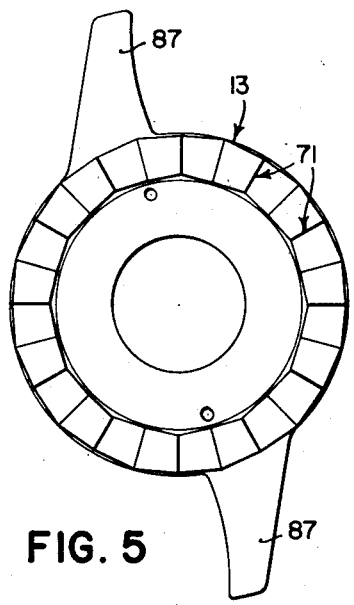
Figures 5 and 6 are elevational views of opposite sides of the engaging member of the clutch.
Figure 6:
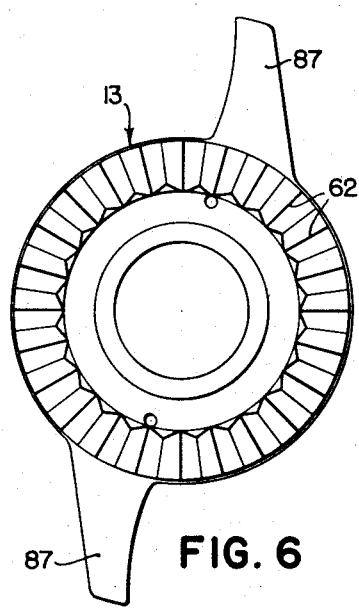

Figure 9 is a developed section taken generally along the line 9—9 of Figure 2, showing the positions of the parts when the clutch is engaged. Figure 10 is a similar view, showing the positions of the parts when the clutch is disengaged.

Referring now more particularly to Figure 1, the grain drill in which the principles of the present invention have been incorporated is indicated in its entirety by the reference numeral 1 and comprises a main frame 2 supported by ground wheels and seeding mechanism of conventional construction actuated by a jackshaft 3 which is driven in any suitable way from the ground wheels. The grain drill also includes a rockshaft 4 and ground-engaging furrow openers which are connected to be raised and lowered by suitable connections to the rockshaft 4. The latter is operated by self-interrupting clutch mechanism 5, with which the present invention is more particularly concerned, and the clutch 5 is driven by a sprocket chain 6 or the like from the jackshaft 3. The main frame 1 includes a pair of fore and aft extending cross bars 7 and 8 upon which the clutch mechanism 5 is carried.

Referring now more particularly to Figures 2 et seq., the clutch mechanism 5, in which the principles of the present invention have been embodied, includes a clutch-driving member 11, a clutch-driven member 12 mounted coaxially for rotation about a common axis, and a clutch-controlling member in the form of an engaging ring 13 disposed between the members 11 and 12. The driven member 12 is provided with a tapered section 14 to which the hub of a shouldered crank member 15 is fixably held, as by a cap screw 15a. The hub of the crank member 15 is mounted for rotation in a bearing bracket 16. The driven member 12 also includes an inner oppositely extending elongated spindle section 17, the outer end of which is mounted in a shouldered bearing sleeve 19 that is received by and carried on a bearing bracket 21, which may be identical with the bearing bracket 16. The two bearing brackets 16 and 21 are secured in any suitable way to the frame bars 7 and 8, as by bolts 23. The crank member 15 carries a pin 28 which is operatively connected to adjusting mechanism 29 and by an operating link 31 to an arm 32 on the rockshaft 4 whereby operating movements of the clutch are transmitted to the rockshaft 4.

As best shown in Figure 3, the driving member 11 of the clutch 5 includes a hub section 41 mounted for rotation on the extended sleeve portion 17 of the driven clutch member 12, the hub portion 41 extending axially from the shoulder portion 42 on the bearing member 19 to the inner face of the driven clutch member 12, there being a thrust washer 43 disposed between the inner end of the hub 41 on the driving clutch member 11 and the inner face of the driven clutch member 12. The outer end of the elongated spindle portion 17 of the driven clutch member 12 is provided with a reduced squared section 44 which receives a similarly formed abutment collar 45, the latter being held in place by a stud bolt 46 which is threaded into a tapped opening 47 in the outer end of the spindle section 17. By this means, the driving and driven members of the clutch are held against axial displacement relative to the bearing bracket 21 and associated parts. The driving clutch member 11 includes a radially outwardly extending web section 51 which terminates in a peripheral portion formed with a plurality of sprocket teeth 52 which are constructed and arranged to receive the driving chain 6, and on the inner face of the member 11, radially inwardly of the sprocket teeth 52, is a laterally inwardly extending flange 55 radially inwardly of which is a series of serrations, preferably in the form of axially inwardly facing projections 56 and recesses 57 joined by sloping walls 58 which lie at a predetermined angle A (Figure 9) relative to a plane normal to the axis of rotation of the driving and driven clutch members. The engaging ring member 13 that is disposed between the driving and driven clutch members 11 and 12 is provided with an interior hub section 61 and is loosely mounted on the hub section 41 of the driving member 11. The engaging ring is provided, on the side thereof facing the driving clutch member 11, with a plurality of serrations 62 formed to have the same configuration and dimension as the companion serrations on the driving member 11.

The main body of the driven clutch member 12 includes a plate section 65 on the laterally inner face of which is disposed a peripheral series of axially inwardly facing serrations 66, preferably in the form of projections 67 and recesses 68 joined by sloping walls, and on the face of the engaging ring member 13 adjacent the serrations 66 is a plurality of similarly formed serrations 71 having the same slope and configuration of the serrations 66. As best shown in Figure 9, the slope B of the angular walls of the serrations 66 and 71 is somewhat greater than the slope A of the walls of the serrations 56 and 62, while the circular pitch and tooth depth of the serrations 66 and 71 are twice the corresponding circular pitch and tooth depth of the serrations 56 and 62. Also, the spacing between the driving and driven members 11 and 12 of the clutch is such that the engaging ring member 13 is capable of axial movement therebetween sufficient to cause the serrations 62 to move into full mesh with the serrations 56 or entirely out of contact therewith while the serrations 66 and 71 are interengaged in both positions of the engaging ring 13.

A pair of springs 75 are disposed on opposite sides of the axis of the driving and driven clutch members 11 and 12, and one end of each of the springs 75 is connected by a cotter 76 or the like to the driven clutch member 12 on the inner side thereof, and the other end of each of the springs 75 is connected by a similar cotter 77 or the like to the radially inner web portion of the engaging ring 13. As best shown in Figure 2, the springs 75 form biasing means tending to rock the ring member relative to the driven clutch member 12 about the axis of the driving and driven clutch members 11 and 12. Additionally, the anchoring cotters 76 and 77 are so arranged that the springs 75 have an axially directed component acting to urge the ring member 13 axially toward the driven clutch member 12, as shown in Figure 9.

For controlling the operation of the clutch 5 I provide a trip lever 78 pivotally mounted on a bracket 79 carried by the grain drill frame. A stop roller 81 is mounted on a bracket 82 that is fixed to the lever 78, and a spring 83 is connected between the trip lever 78 and the grain drill frame for urging the lever for movement toward the clutch. Cooperating with the roller 81 is a pair of notches 84 formed in diametrically opposed relation in radially outer flanges 85 formed on the driven clutch member 12. Abutment extensions 86, extending radially outwardly beyond the notched portions 84, are also formed in the radial flanges 85 for cooperation with the roller 81. The engaging ring 13 which is mounted closely adjacent the driven clutch member 12, is provided with a pair of radially outwardly generally diametrically opposed arms 87 which normally lie adjacent the notched portions 84. A pull rope 90 is connected at its rear end to the outer end of the trip lever 78 and extends to the operator's station, either on the grain drill itself or on the propelling tractor.

In operation, when the rockshaft 4 is held in position by the clutch mechanism 5, the clutch parts are in the relative positions shown in Figures 2 and 3. The stop roller 81 lies in one of the notches 84 and contacts the associated arm 87 on the engaging ring member 13 for holding the latter in such a position relative to the driven clutch member 12, which is locked against rotation by the disposition of the locking roller 81 in the notch 84, that the serrations 71 on the outer face of the engaging ring member 13 are in full mesh with the serrations 66 formed on the inner face of the driven clutch member 12, the springs 75 lying at a slight angle so as to exert a laterally directed component of force acting to hold the ring member 13 against the driven member 12 and out of contact with the driving clutch member 11, whereby the clutch when disconnected does not clatter or vibrate. The springs 75 are so arranged that just as soon as the trip lever 78 is rocked to disengage the roller 81 from the associated notch 84, the ring member 13 is rocked through a given extent relative to the driven clutch member 12. However, due to the angularity of the walls of the serrations 66 and 71, such rocking movement of the engaging ring 13 causes the latter to be shifted axially a distance such that the serrations 62 become engaged with the serrations 56 on the constantly rotating driving clutch member 11. When this occurs a positive driving connection is thus established by the laterally shiftable ring member 13 between the driving clutch member 11 and the driven clutch member 12, whereby the rotation of the driving member drives the driven member 12, that is, the angularity of the smaller serrations 56 and 62 cause the driving clutch member to wedge tightly against the engaging ring 13 and, in turn, cause the serrations 71 on the latter to be wedged tightly against the serrations 66 on the driven clutch member 12, whereby a positive drive is established. When the driving and driven clutch members have been rotated through a half-revolution, provided the trip lever 78 has already been released, the other notch 84 comes into a position adjacent the roller 81 whereupon the spring 83 acts through the trip lever 78 to cause the roller 81 to enter the second notch 84. However, before entering the second notch 84, the roller 81 contacts the other arm 87 on the engaging ring 13, thereby serving as a stop to limit further rotation of the ring member 13. The driving member 11 continues to rotate, but due to the angular dispositions of the walls of the serrations 56 and 62, the ring member 13 is shifted axially toward the driven clutch member 12 with a positive force, causing the serrations 71 at the other side of the ring member 13 to be forced against the serrations 66 on the driven clutch member 12. This momentarily advances the driven clutch member 12 an amount slightly less than the corresponding degree of rotation of the driving clutch member 11. This is achieved by having the slopes of the smaller serrations 56 and 62 less than the slopes of the serrations 66 and 71, whereby the friction between the sets of serrations is overcome by a continued rotation of the driving clutch member 11 and the engaging ring 13 is shifted axially toward the driven clutch member 12 without overloading the trip lever 78 which, when the roller 81 engages one of the arms 87, must hold the ring member 13 against rotation. When the trip lever 78 is moved away from the clutch to permit the engaging ring 13 to interconnect the driving and driven clutch members 11 and 12, the driven clutch member 12 may overrun the driving clutch member 11, where such action is desirable or necessary since, as will be clear from Figure 9, if the driven clutch member 12 is moved faster than the driving clutch member 11, the engaging ring 13 may move toward the driven clutch member 12 a distance sufficient to click over the serrations 56 on the driving clutch member 11.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention, as defined by the appended claims.

What I claim, therefore, and desire to secure by Letters Patent is:

1. A self-interrupting clutch of the plow lift type, comprising a pair of spaced apart coaxially arranged driving and driven members, serrations on the adjacent faces of said members, an engaging member mounted for limited axial movement between said members and having companion serrations on its opposite faces, spring means connected between said engaging member and said driven clutch member for shifting said engaging member into engagement with the serrations on said driving member while the serrations on the engaging member and the driven member remain in engagement, and means releasably engageable with said driven and engaging members for holding the latter member against movement relative to the driven member under the bias exerted by said spring means, said spring means being connected to act between said engaging member and said driven clutch member at an angle whereby said spring means has a component of force available to shift said engaging member toward said driven member and out of engagement with said driving member when said driven and engaging members are held against relative rotation.

2. A self-interrupting clutch of the plow lift type, comprising a pair of spaced apart coaxially arranged driving and driven members, serrations on the adjacent faces of said members, an engaging member mounted for limited axial movement between said members and having companion serrations on its opposite faces adapted to engage said first mentioned serrations, spring means connected between said driven member and said engaging member to act circumferentially thereagainst in one direction for shifting said engaging member into engagement with the serrations on said driving member whereby the driving member drives the driven member through said engaging member, and means connectible with said engaging member to shift the latter in the other direction, relative to the driven member for disengaging the engaging member from the driving member, the serrations on said engaging member and said driving member having portions angled whereby when said driving member rotates relative to said engaging member, the latter member is shifted toward said driven member.

3. A self-interrupting clutch of the plow lift type, comprising a pair of spaced apart coaxially arranged driving and driven members, serrations on the adjacent faces of said members, an engaging member mounted for limited axial movement between said members and having companion serrations on its opposite faces, the serrations on the driven member and the serrations on the engaging member facing said driven member being appreciably deeper than the serrations on the opposite side of said engaging member and the companion serrations on the driving member, whereby the serrations on the driven member and the companion serrations on the engaging member remain in engagement after the serrations on the driving member and the engaging member are separated, and control means comprising a stop member engageable with said engaging member for stopping movement thereof, said serrations being so angled that when said engaging member is stopped, continued rotation of the driving member acts to shift said engaging member laterally out of engagement with the driving member and into full engagement with said driven member.

4. The invention set forth in claim 3, further characterized by means engageable with said stop member for locking said driven member against movement when the engaging member has been disengaged from the driving member, and means acting between said driven member and said engaging member for shifting the latter, when released from the driving member, toward the driven member.

5. A self-interrupting clutch of the plow lift type, comprising a pair of spaced apart coaxially arranged driving and driven members, serrations on the adjacent faces of said members, an engaging member mounted for limited axial movement between said members and having companion serrations on its opposite faces, the serrations on the driven member and the serrations on the engaging member facing said driven member being appreciably deeper than the serrations on the opposite side of said engaging member and the companion serrations on the driving member, whereby the serrations on the driven member and the companion serrations on the engaging member remain in engagement after the serrations on the driving member and the engaging member are separated, and control means comprising a locking part engageable successively with said engaging member and said driven member for first stopping movement of said engaging member, said serrations being so angled that when said engaging member is stopped, continued rotation of the driving member acts to shift said engaging member laterally out of engagement with the driving member and into full engagement with said driven member, and then locking said driven member against movement.

6. A self-interrupting clutch of the plow lift type, comprising a pair of spaced apart coaxially arranged driving and driven members, serrations on the adjacent faces of said members, an engaging member mounted for limited axial movement between said members and having companion serrations on its opposite faces, the serrations on the driven member and the serrations on the engaging member facing said driven member being appreciably deeper than the serrations on the opposite side of said engaging member and the companion serrations on the driving member, whereby the serrations on the driven member and the companion serrations on the engaging member remain in engagement after the serrations on the driving member and the engaging member are separated, control means comprising a locking part engageable successively with said engaging member and said driven member for first stopping movement of said engaging member, said serrations being so angled that when said engaging member is stopped, continued rotation of the driving member acts to shift said engaging member laterally out of engagement with the driving member and into full engagement with said driven member.

7. A self-interrupting clutch comprising a pair of spaced apart coaxially arranged driving and driven members, serrations on the adjacent faces of said members, an engaging member mounted for limited axial movement between said members and having companion serrations on its opposite faces, control means for optionally stopping movement of said engaging member and locking the driven member against movement, the serrations on the driven member and the side of the engaging member adjacent thereto being deeper than the serrations on the driving member and the other side of the engaging member, whereby the engaging member remains connected with the driven member, and the slope of the latter set of serrations being slightly less than the slope of the first mentioned set of serrations, whereby when the engaging member is held against movement by said stopping means, the continued movement of the driving member forces the engaging member toward the driven member and out of engagement with the driving member without overloading the stopping means.

8. A self-interrupting clutch comprising a pair of spaced apart coaxially arranged driving and driven members, serrations on the adjacent faces of said members, an engaging member mounted for limited axial movement between said members and having companion serrations on its opposite faces, control means for optionally stopping movement of said engaging member, the serrations on the driven member and the side of the engaging member adjacent thereto being deeper than the serrations on the driving member and the other side of the engaging member, whereby the engaging member remains connected with the driven member, the slope of the latter set of serrations relative to the slope of the first mentioned set of serrations being such that, when the engaging member is held against movement by said stopping means, the continued movement of the driving member forces the engaging member toward the driven member and out of engagement with the driving member without overloading the stopping means, and means for locking the driven member against rotation when the engaging member has been moved away from the driving member.

9. A self-interrupting clutch comprising a pair of spaced apart coaxially arranged driving and driven members, serrations on the adjacent faces of said members, an engaging member mounted for limited axial movement between said members and having companion serrations on its opposite faces, control means for optionally stopping movement of said engaging member, the serrations on the driven member and the side of the engaging member adjacent thereto being deeper than the serrations on the driving member and the other side of the engaging member, whereby the engaging member remains connected with the driven member, the slope of the latter set of serrations relative to the slope of the first mentioned set of serrations being such that, when the engaging member is held against movement by said stopping means, the continued movement of the driving member forces the engaging member toward the driven member and out of engagement with the driving member without overloading the stopping means, means for locking the driven member against rotation when the engaging member has been moved away from the driving member, and biasing means acting between said engaging and driven members for holding the engaging member out of contact with the driving member when the driven member is locked against movement.

10. The invention set forth in claim 9, further characterized by said biasing means acting between said driven and engaging means in such direction that, when said stopping means is moved away from the engaging member the latter is moved into engagement with the driving member.

11. A self-interrupting clutch comprising a pair of spaced apart coaxially arranged driving and driven members, serrations on the adjacent faces of said members, an engaging member mounted for limited axial movement between said members and having companion serrations on its opposite faces, control means for optionally stopping movement of said engaging member, the serrations on the driven member and the side of the engaging member adjacent thereto being deeper than the serrations on the driving member and the other side of the engaging member, whereby the engaging member remains connected with the driven member, the slope of the latter set of serrations relative to the slope of the first mentioned set of serrations being such that, when the engaging member is held against movement by said stopping means, the continued movement of the driving member forces the engaging member toward the driven member and out of engagement with the driving member without overloading the stopping means, means for locking the driven member against rotation when the engaging member has been moved away from the driving member, biasing means acting between said engaging and driven members for holding the engaging member out of contact with the driving member when the driven member is locked against movement, and biasing means acting between said driven and engaging means in such direction that, when said stopping means is moved away from the engaging member the latter is moved into engagement with the driving member.

12. A self-interrupting clutch of the plow lift type, comprising a pair of spaced apart coaxially arranged driving and driven members, serrations on the adjacent faces of said members, an engaging member mounted for limited axial movement between said members and having companion serrations on its opposite faces, the serrations on the driven member and the serrations on the engaging member facing said driven member being appreciably deeper than the serrations on the opposite side of said engaging member and the companion serrations on the driving member, whereby the serrations on the driven member and the companion serrations on the engaging member remain in engagement after the serrations on the driving member and the engaging member are separated, said engaging member and said driven member each having a notch therein, said notches being arranged so as to lie in registry one with the other when the serrations on the engaging member facing said driven member lie in substantially complete engagement with the serrations on said driven member, a controlling member having a part adapted to seat in both of said notches for holding said engaging member and said driven member against rotation.

13. The invention set forth in claim 12, further characterized by spring means acting between said engaging member and said driven clutch member for moving the engaging member relative to the clutch member, whereby the serrations on the driven clutch member and the companion serrations on the engaging member cause the latter member to move axially into engagement with the driving clutch member when the control member is moved out of said notches.

14. The invention set forth in claim 13, further characterized by said spring means being connected between said engaging member and said driven clutch member so as to have a component of force effective to cause the engaging member to move axially toward said driven clutch member when said control member lies in said notches.

JOHN H. STARR.

References Cited in the file of this patent

UNITED STATES PATENTS

| Number | Name | Date |
| --- | --- | --- |
| 540,378 | Woodward | June 4, 1895 |
| 1,352,293 | Lovell | Sept. 7, 1920 |
| 1,907,619 | Soden-Fraum Hofen | May 9, 1933 |
| 1,990,999 | Pondelicek | Feb. 12, 1935 |
| 2,432,897 | Hyland et al. | Dec. 16, 1947 |

FOREIGN PATENTS

| Number | Country | Date |
| --- | --- | --- |
| 437,803 | Germany | Nov. 29, 1926 |